United States Patent [19]

Kasahara

[11] Patent Number: 4,975,802
[45] Date of Patent: Dec. 4, 1990

[54] ELECTROSTATIC ADSORBING APPARATUS HAVING ELECTROSTATIC ADSORBING PLATE FOR ADSORBING AND LAMINATING A PLURALITY OF OBJECTS TO BE ADSORBED

[75] Inventor: Keiji Kasahara, Shizuoka, Japan

[73] Assignee: Kabushiki Kaisha Abisare, Shizuoka, Japan

[21] Appl. No.: 357,319

[22] Filed: May 25, 1989

[30] Foreign Application Priority Data

Jul. 25, 1988 [JP] Japan ................. 63-185031
Dec. 21, 1988 [JP] Japan ................. 63-323009

[51] Int. Cl.⁵ ............................................ H02N 13/00
[52] U.S. Cl. ........................................ 361/233; 361/234
[58] Field of Search .............. 361/225, 226, 230, 233, 361/234, 235

[56] References Cited

U.S. PATENT DOCUMENTS

| | | | |
|---|---|---|---|
| 3,582,730 | 6/1971 | Teston | 361/234 |
| 3,634,740 | 1/1972 | Stevko | 361/234 |
| 3,892,614 | 7/1975 | Levy | 361/234 |
| 3,916,270 | 10/1975 | Wachtler et al. | 361/225 |
| 4,667,110 | 5/1987 | Kariya | 361/234 |
| 4,751,609 | 6/1988 | Kasahara | 361/234 |
| 4,766,515 | 8/1988 | Bollen et al. | 361/234 |

OTHER PUBLICATIONS

IBM Technical Disclosure Bulletin, vol. 21, No. 11, Apr. 1979, "Electrostatic Holding Fixture for Flatness of a Nonrigid Sheet in Vacuum".

Primary Examiner—A. D. Pellinen
Assistant Examiner—Jeffrey A. Gaffin
Attorney, Agent, or Firm—Flynn, Thiel, Boutell & Tanis

[57] ABSTRACT

An electrostatic adsorbing apparatus includes an electrostatic adsorbing plate for adsorbing and laminating a plurality of objects. The adsorbing apparatus has a set of electrodes and the electrostatic adsorbing plate adsorbs and holds sheet-shaped objects by an electrostatic adsorbing force induced by the set of electrodes. The electrodes are arranged like a comb in the electrostatic adsorbing plate, and a plurality of adsorbing portions which extend in the horizontal direction are formed on the surface of the electrostatic adsorbing plate so as to adsorb and laminate a plurality of the sheet-shaped objects such that upper end portions of the objects are slightly vertically offset from each other.

9 Claims, 6 Drawing Sheets

FIG.1
FIG.2
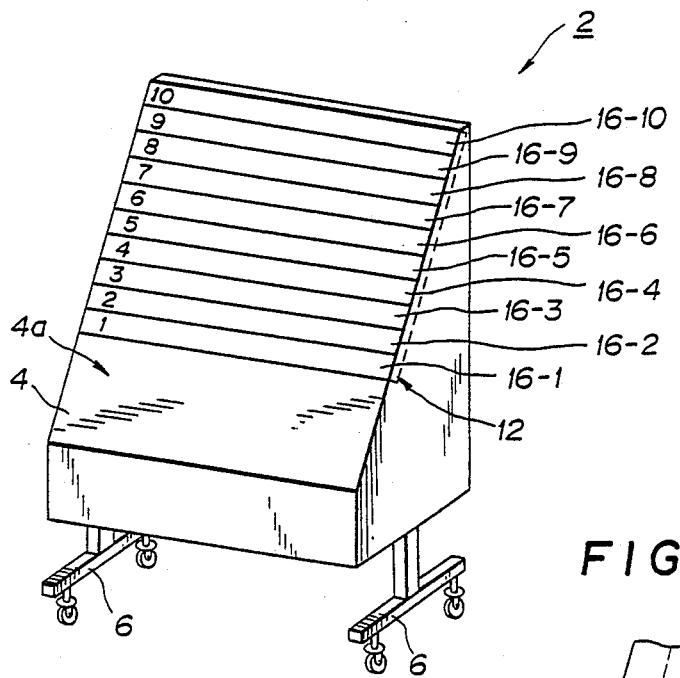
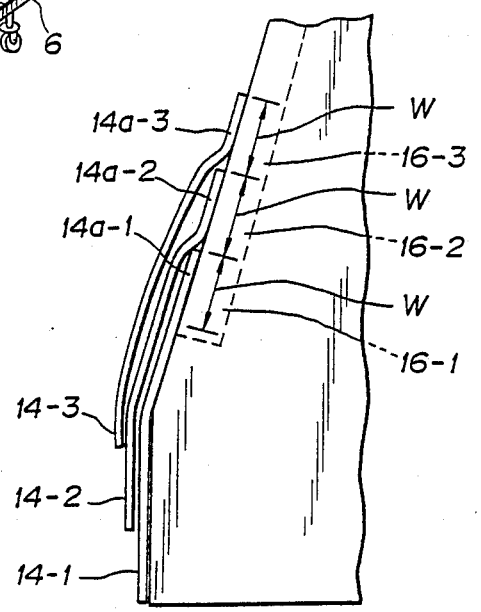

ELECTROSTATIC ADSORBING APPARATUS HAVING ELECTROSTATIC ADSORBING PLATE FOR ADSORBING AND LAMINATING A PLURALITY OF OBJECTS TO BE ADSORBED

FIELD OF THE INVENTION

The present invention relates to an electrostatic adsorbing apparatus having an electrostatic adsorbing plate for adsorbing and laminating a plurality of objects to be adsorbed and, more particularly, to such an electrostatic adsorbing apparatus wherein an electrostatic adsorbing force is generated by a set of electrodes to adsorb and hold sheet-shaped objects.

BACKGROUND OF THE INVENTION

According to a known electrostatic holding means for adsorbing and holding an object by using the Coulomb force of static electricity, positive and negative charges are respectively applied to a set of electrodes by an electric current supply to thereby induce an adsorbing mechanism, and the object to be adsorbed is adsorbed and held by the electrostatic adsorbing force of the adsorbing mechanism. Such electrostatic holding means is used in mechanical equipment in various industrial fields, for instance, in the original pressing portion of a copying apparatus, in the carrying object holding portion of a conveying apparatus, or the like.

In the conventional electrostatic adsorbing apparatus having an electrostatic adsorbing plate, an object is adsorbed and held at a desired position by the electrostatic adsorbing plate and is used as a notice board or an original pressing device.

However, the idea of using the above electrostatic adsorbing plate as a temporary storage device has not yet been proposed.

That is, when large papers of the A0 or A1 size or the like are stored, wrinkles or creases on the papers are prevented by hanging the large papers on a rod-like member or by placing the large papers on a flat plate in a plane manner.

However, when a paper is hung on the rod-like member, although the storage space is small, there is an inconvenience in that the paper has a fold, making it difficult to use the paper. On the other hand, when the paper is stored in a plane manner, there is an inconvenience in that the storage space is large, the space cannot be effectively used, and the storage is practically disadvantageous.

It is, therefore, an object of the present invention to provide an electrostatic adsorbing apparatus having an electrostatic adsorbing plate for adsorbing and laminating a plurality of objects, wherein, in order to eliminate the foregoing inconveniences, electrodes are arranged like a comb in the electrostatic adsorbing plate of the electrostatic adsorbing apparatus, and adsorbing portions which extend in the horizontal direction are formed on the surface of the electrostatic adsorbing plate in order to adsorb and laminate the objects so as to slightly vertically offset the upper end portions thereof. In this manner, the required storage space for the adsorbed objects can be reduced, and the storage is practically advantageous in that each adsorbed object can be easily extracted.

SUMMARY OF THE INVENTION

To accomplish the above and other objects, the present invention provides an electrostatic adsorbing apparatus having a set of electrodes and an electrostatic adsorbing plate which adsorbs and holds sheet-like objects by an electrostatic adsorbing force induced by the set of electrodes, characterized in that the electrodes are arranged like a comb in the electrostatic adsorbing plate and adsorbing portions which extend in the horizontal direction are formed on the surface of the electrostatic adsorbing plate to adsorb and laminate the objects so as to slightly vertically offset the upper end portions thereof. On the other hand, the invention provides an electrostatic adsorbing apparatus having a set of electrodes and an electrostatic adsorbing plate which adsorbs and holds sheetlike objects by an electrostatic adsorbing force induced by the set of electrodes, characterized in that the electrodes are arranged like a comb in the electrostatic adsorbing plate, vertically arranged adsorbing portions which extend in the horizontal direction are formed on the surface of the electrostatic adsorbing plate so as to adsorb and laminate the objects while slightly vertically offsetting the upper end portions thereof, and an enclosing portion to temporarily enclose the sheet-like objects to be adsorbed is provided below the vertically mounted adsorbing portions.

Since the invention is constructed as mentioned above, the objects to be adsorbed are sequentially adsorbed and laminated to horizontally extending adsorbing portions so that the upper end portions of the objects are slightly offset vertically from each other. The storage space of the objects is thereby reduced and each object can be easily extracted.

An embodiment of the present invention will be described in detail hereinbelow on the basis of the drawings, in which:

BRIEF DESCRIPTION OF THE DRAWINGS

FIG. 1 is a perspective view of an electrostatic adsorbing apparatus embodying the present invention;

FIG. 2 is a partial end view of the apparatus of FIG. 1 shown with laminated objects adsorbed thereon;

DETAILED DESCRIPTION

Figure 2A:
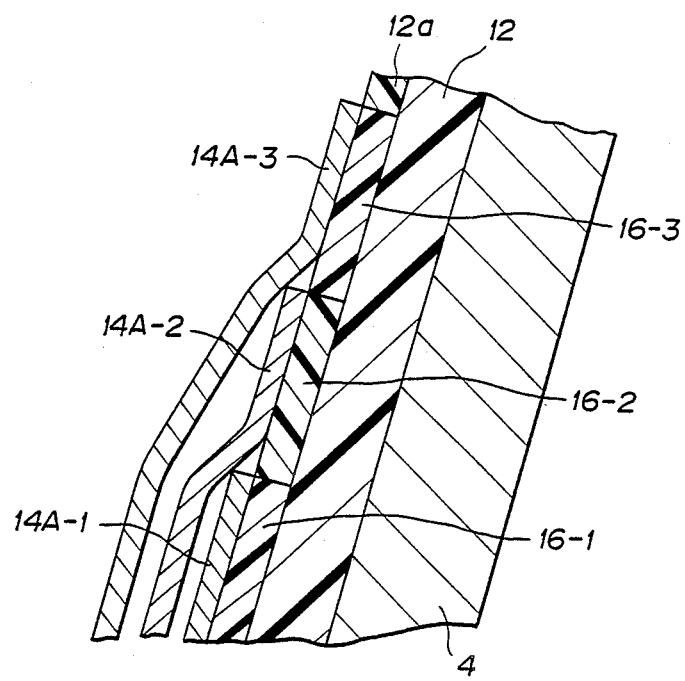
FIG. 2A is an enlarged sectional view of a portion of FIG. 2 showing the structural relationship of the adsorbing portions and the adsorbing plate.
Figure 3:
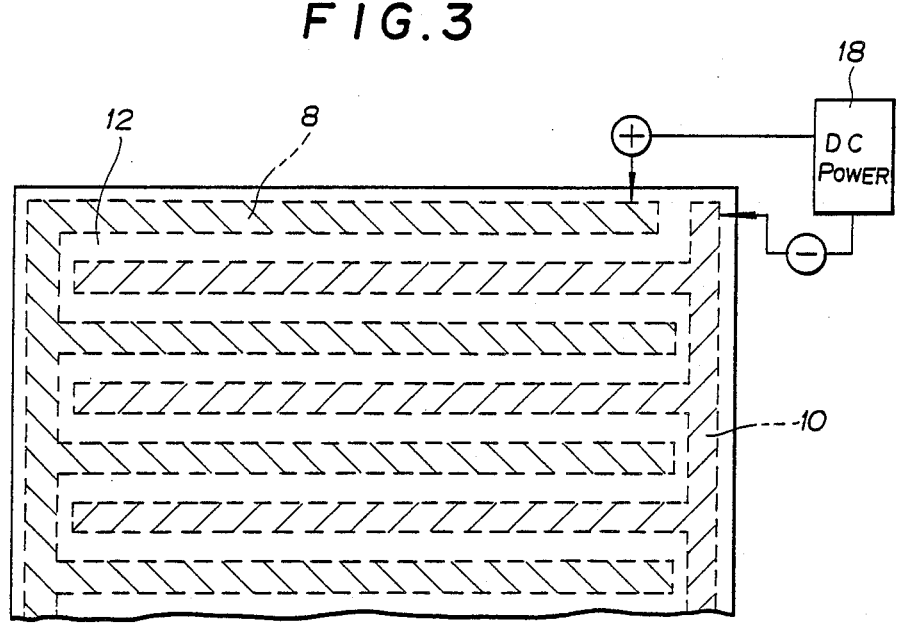
FIG. 3 is a schematic diagram showing an arrangement of a set of electrodes on the inventive apparatus of FIGS. 1 and 2.

FIGS. 1 to 3 show the first embodiment of the invention. In FIG. 1, reference numeral 2 denotes an electrostatic adsorbing apparatus. The electrostatic adsorbing apparatus 2 includes: a main body 4 formed with a portion of a mounting surface 4a so as to be inclined at an angle of about 5° to 15° from the vertical direction; leg portions 6 to movably support the main body 4; and an electrostatic adsorbing plate 12 which generates an electrostatic adsorbing force induced by a set of respectively positive and negative electrodes 8 and 10 (FIG. 3)

formed on the inclined mounting surface 4a of the main body 4.

As shown in FIG. 3, the electrostatic adsorbing plate 12 includes a set of electrodes 8 and 10 arranged like a comb in the lateral (horizontal) direction. The plate 12 generates the electrostatic adsorbing force induced by the set of respectively positive and negative electrodes 8 and 10, thereby adsorbing and holding sheet-like objects 14, such as large papers or the like. The absorbing plate 12 is believed conventional and may have a structure, for example, similar to that disclosed in U.S. Pat. No. 4,751,609, which is incorporated herein by reference.

Referring to FIGS. 1 and 2, adsorbing portions 16-1 to 16-10, which extend in the horizontal direction and have a predetermined width W, are formed on a surface 12a of the electrostatic adsorbing plate 12. The left ends of the adsorbing portions 16-1 to 16-10 are, in this embodiment, sequentially numbered from the lower portion, respectively. The adsorbing portions 16-1 to 16-10 are preferably made from synthetic resins such as plastics or other dielectric materials. Referring to FIG. 2A, the adsorbing portions 16-1 to 16-10 are secured to the surface 12a of the adsorbing plate 12 by a suitable adhesive, for example, glue.

Experimentation has shown that the horizontal adsorbing force of the electrostatic adsorbing apparatus 2 is about 3 to 6 kg in the case of one paper of the A4 size. Since the weight of 50 to 100 papers of the A4 size is 200 to 1000 g, a sufficient adsorbing holding force can be obtained.

Reference numeral 14a denotes an upper end portion of the object 14 to be adsorbed and 18 (FIG. 3) indicates a DC power source of 500 to 2000 V which is respectively connected to the set of positive and negative electrodes 8 and 10.

The operation of the first embodiment will now be described.

When adsorbing and laminating the objects 14 to the electrostatic adsorbing plate 12 of the electrostatic adsorbing apparatus 2, the objects 14 are sequentially adsorbed and laminated to a plurality of adsorbing portions 16 which extend in the horizontal direction. Due to the inclining arrangement of the adsorbing portions 16-1 to 16-10 on the mounting surface 4a (FIGS. 1 and 2), the upper end portions 14a of the objects 14 are slightly vertically offset from each other. That is, as shown in FIG. 2, an upper end portion 14a-1 of a first object 14-1 to be adsorbed is adsorbed to the first adsorbing portion 16-1. Next, an upper end portion 14a-2 of a second object 14-2 is adsorbed to the second adsorbing portion 16-2 slightly vertically offset from the upper end portion 14a-1 of the first object 14-1 (FIG. 2). The third and subsequent objects 14 are adsorbed while slightly vertically offsetting the respective upper end portions 14a thereof in a manner similar to that mentioned above.

Thus, a plurality of objects 14 to be adsorbed consisting of large papers or the like of size A0, A1, etc. can be easily stored. The storage space of the objects 14 can be reduced, and space can be more effectively used, making the invention practically advantageous.

Also, by sequentially adsorbing and laminating a plurality of objects 14 to a plurality of horizontally extending adsorbing portions 16 while slightly vertically offsetting the upper end portions 14a of the objects 14, each object 14 can be easily extracted. The efficiency and convenience of the invention can be further improved by the numbers written at the left ends of the adsorbing portions 16.

Further, when the adsorbed objects 14 are stored using the inventive apparatus, it is possible to substantially prevent the appearance of wrinkles or creases on the objects 14. The use efficiency when using the objects 14 can be preferably maintained.

Moreover, by setting the width W of adsorbing portions 16 to a large value, a stronger electrostatic adsorbing force can be obtained. Thus, effective lamination and adsorption according to the weight of object 14 to be adsorbed can be realized by providing adsorbing portions 16 of appropriate width W.

Figure 4:
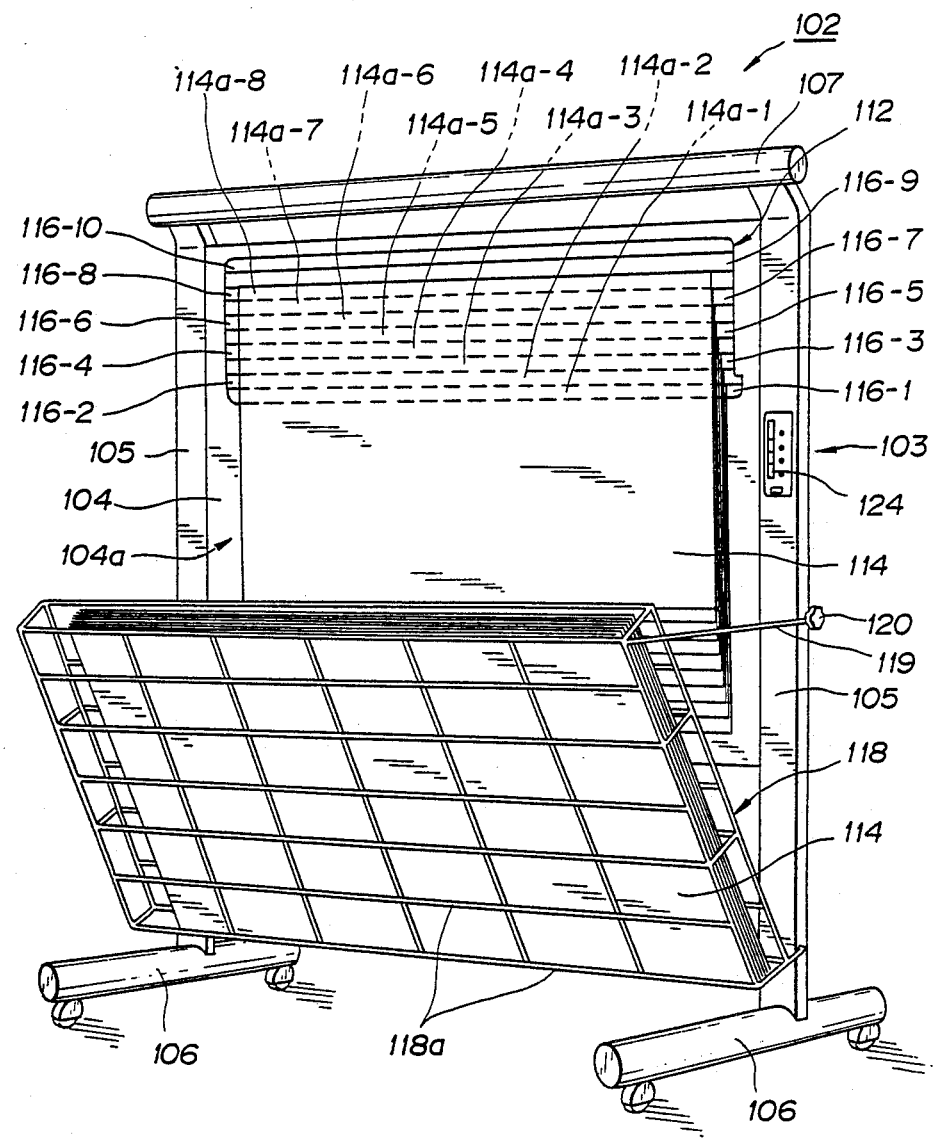
FIG. 4 is a perspective view showing a second embodiment of the inventive electrostatic adsorbing apparatus in use.
Figure 5:
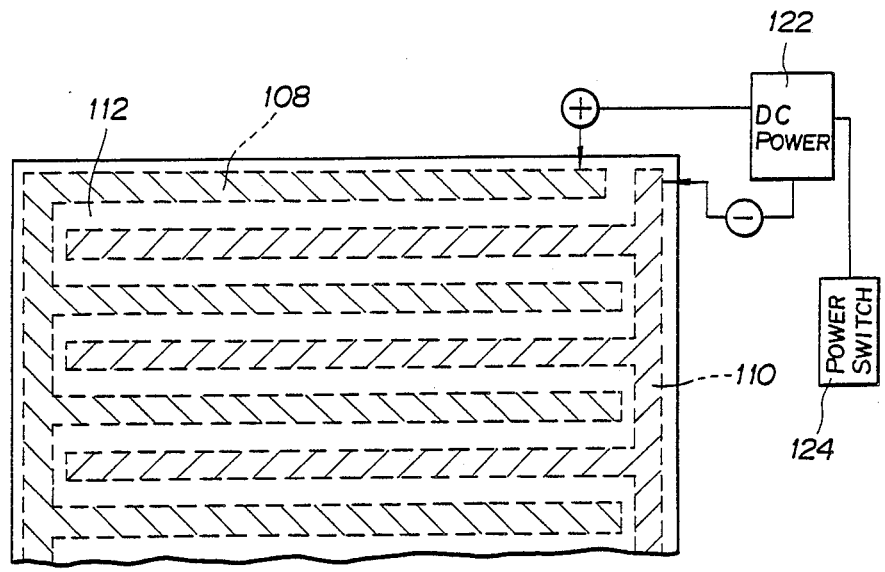
FIG. 5 is a schematic diagram similar to FIG. 3, showing an arrangement of a set of electrodes on the apparatus of FIG. 4.
Figure 6:
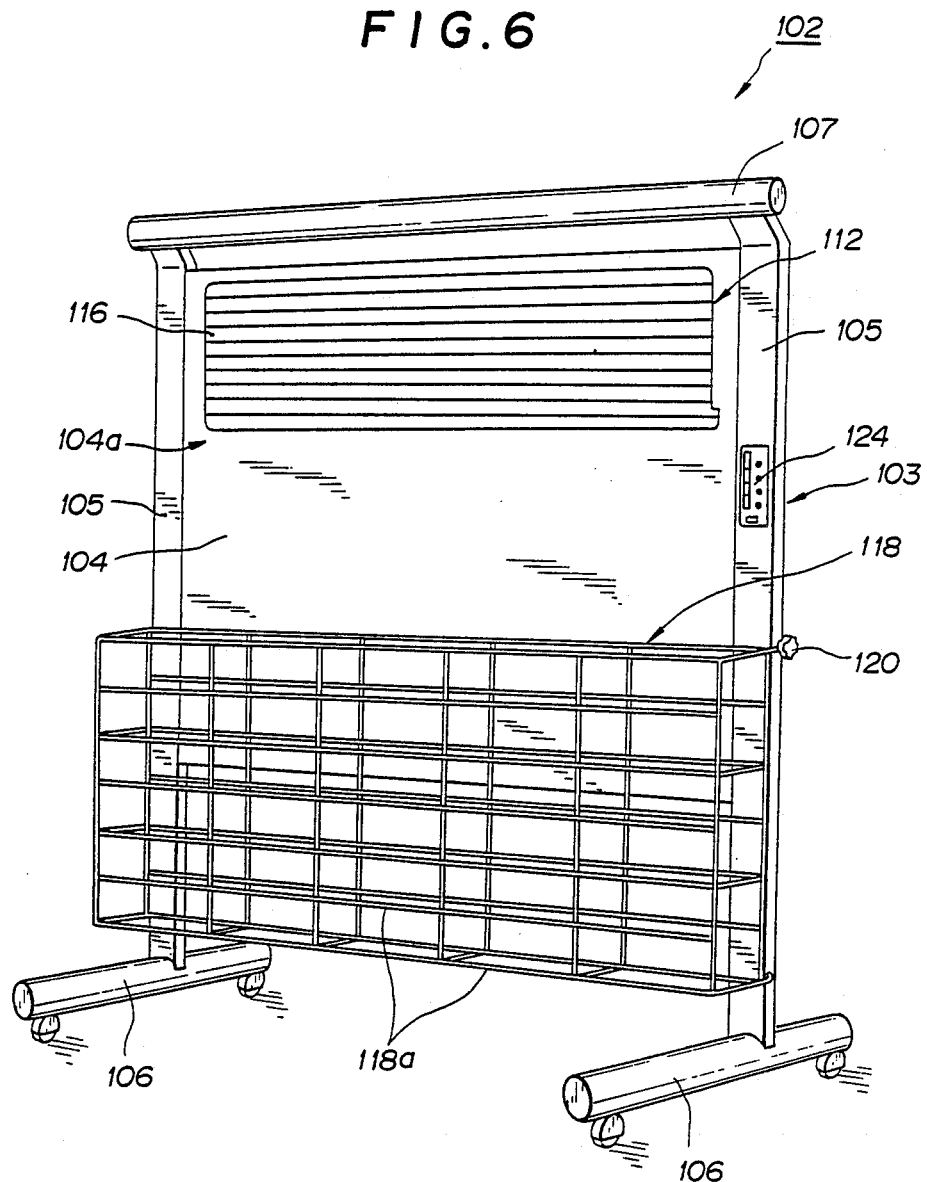
FIG. 6 is a perspective view showing the electrostatic adsorbing apparatus of FIG. 4 when not in use.

FIGS. 4 to 6 show a second embodiment of the invention. In the second embodiment, the portions having the same functions as those in the first embodiment mentioned above are designated by the same reference numerals and will be explained.

More specifically, this second embodiment comprises an electrostatic sheet-holding apparatus 102 having a generally upright frame 103 which is fixedly secured to and projects upwardly from a pair of roller-supported legs 106 which are adapted to be movingly supported on a floor. The frame 103 includes generally parallel side rails 105 which project upwardly from the legs and are rigidly joined together by a top rail 107. The frame includes a main plate-like body 104 which is fixed to and extends between the side rails 105, this plate-like body being generally vertically oriented. This plate-like main body 104 is provided with an electrostatic adsorbing plate 112 provided on the vertical mounting surface 104a of the body 104. The electrostatic adsorbing plate 112 defines thereon a plurality of horizontally elongate adsorbing portions 116 which are disposed vertically adjacent one another. This electrostatic adsorbing plate generates an electrostatic adsorbing force induced by a set of respectively positive and negative electrodes 108 and 110 as positioned between the plates 112 and 104.

As shown in FIG. 5, the electrostatic adsorbing plate 112 includes a set of electrodes 108 and 110 arranged like a comb in the lateral direction. The plate 112 generates the electrostatic adsorbing force induced by the set of respectively positive and negative electrodes 108 and 110, thereby adsorbing and holding sheet-like objects 114, such as large papers of the A0 or A1 size or the like.

Referring to FIG. 4, vertically arranged adsorbing portions 116-1 to 116-10 which extend in the horizontal direction and have a predetermined width are formed on the electrostatic adsorbing plate 112. The adsorbing portions 116 are arranged in a generally successively overlying vertical relationship so that portion 116-2 is vertically above portion 116-1, etc. The left end portions of the vertical adsorbing portions 116-1 to 116-10 may be sequentially numbered from the lower portion, respectively.

Experimentation reveals that the horizontal adsorbing force of the foregoing electrostatic adsorbing apparatus 102 is about 3 to 6 kg in the case of one paper of the A4 size. The weight of 50 to 100 papers of the A4 size is 200 to 1000 g. Thus, sufficient adsorbing holding force can be obtained.

The apparatus 102 also includes an enclosing or storing device 118 for temporarily storing one or more sheet-like objects 114 therein. This enclosing device 118 is formed substantially as a thin box-like or cubic structure which is hollow and opens upwardly so as to permit one or more sheet-like objects to be vertically inserted into or removed from the enclosing part 118. The enclosing device 118 is preferably constructed of an open grid-like or lattice structure formed from intersecting rod-like elements so as to have generally parallel front and rear vertically enlarged walls joined by narrow side walls, including a narrow bottom wall. This narrow box-like arrangement is hollow and opens along the top thereof so that the sheet-like objects can be moved vertically downwardly into the device 118 for storage or alternately the objects 114 can be moved vertically out of the device 118 when desired.

This enclosing or storage device 118 is preferably mounted on the apparatus 102 vertically below the adsorbing portions 116. The storage device 118 extends horizontally between the upright side rails 105, and the lower corners of this storage device are supported on the side rails so as to be hingeable relative thereto. The upper corners of the storage device have inwardly extending connecting rods 119 which connect to adjustable securing screws 120 attached to the side rails. This arrangement enables the storage device 118 to be mounted in a vertical upright position directly adjacent and generally parallel with the upright side rails as illustrated in FIG. 6. Alternately the storage device can be pivoted outwardly about its lower edge away from the side rails so as to be disposed in an inclined relationship thereto, as illustrated by FIG. 4, to facilitate the positioning of objects into the storage device.

Reference numeral 114a denotes an upper end of the object 114 to be adsorbed. A DC power source 122 (FIG. 5) of 500 to 2000 V is respectively connected to the set of positive and negative electrodes 108 and 110, and a power switch 124 (FIGS. 4 and 5) turns on or off the electrostatic adsorbing plate 112 of the electrostatic adsorbing apparatus 102.

The operation of the embodiment of FIGS. 4–6 will now be described.

When adsorbing and laminating the objects 114 to the electrostatic adsorbing plate 112 of the electrostatic adsorbing apparatus 102, the power switch 124 is turned on and, thereafter, the objects 114 to be adsorbed are taken out one by one from the enclosing portion 118. The objects 114 are sequentially adsorbed and laminated to the adsorbing portions 116 which extend in the horizontal direction. Due to the vertical arrangement of the adsorbing portions 116, the upper end portions 114a of the objects 114 are slightly vertically offset. That is, as shown in FIG. 4, an upper end portion 114a-1 of a first object 114-1 is adsorbed to the first adsorbing portion 116-1. Next, an upper end portion 114a-2 of a second object 114-2 is adsorbed to the second adsorbing portion 116-2 slightly vertically offset from the upper end portion 114a-1 of the first object 114-1. Subsequent objects 114 are adsorbed while slightly vertically offsetting the upper end portions 114a thereof in a manner similar to that mentioned above.

When the electrostatic adsorbing apparatus 102 is not used, the enclosing portion 118 is vertically fixed by the inclination adjusting screw portion 120 as shown in FIG. 6.

Thus, when adsorbing and laminating the objects 114 to the electrostatic adsorbing plate 112, the objects 114 can be taken out one by one from the enclosing portion 118. The working efficiency is good and the use efficiency is improved.

On the other hand, in order to allow a plurality of objects 114 to be adsorbed consisting of large papers of the A0 or A1 size or the like to be adaptive to the temperature or moisture environment in the room, the objects 114 can be easily held and the spare objects 114 to be adsorbed can be enclosed in the enclosing portion 118. Therefore, the storage space of the objects 114 can be reduced. The enclosing space for the spare objects 114 to be adsorbed is unnecessary. The space can be effectively used and it is practically useful.

Further, in a manner similar to the first embodiment mentioned above, by sequentially adsorbing and laminating a plurality of objects 114 to a plurality of vertically arranged, horizontally extending adsorbing portions 116 while slightly vertically offsetting the upper end portions 114a of the objects 114, each object 114 can be easily extracted, and the use efficiency further improved.

Further, when the electrostatic adsorbing apparatus 102 is not used, the enclosing portion 118 can be fixed in the vertical position shown in FIG. 6 by the inclination adjustment screw portion 120. Thus, the storage space required for the electrostatic adsorbing apparatus 102 can be reduced.

In addition, since the enclosing portion 118 is provided below the vertical adsorbing portions 116-1 to 116-10 of the electrostatic adsorbing apparatus 102, the position of the center of gravity of the electrostatic adsorbing apparatus 102 is low. The stability of the apparatus 102 is thus improved so that it can be prevented from tipping over.

Moreover, by removing the enclosing portion 118 from the electrostatic adsorbing apparatus 102, the electrostatic adsorbing apparatus 102 can be used as a notice board having the adsorbing function. The generality can be improved and it is practically advantageous.

The invention is not limited to the foregoing first and second embodiments but various modifications and variations are possible, including the rearrangement of parts.

Figure 7:
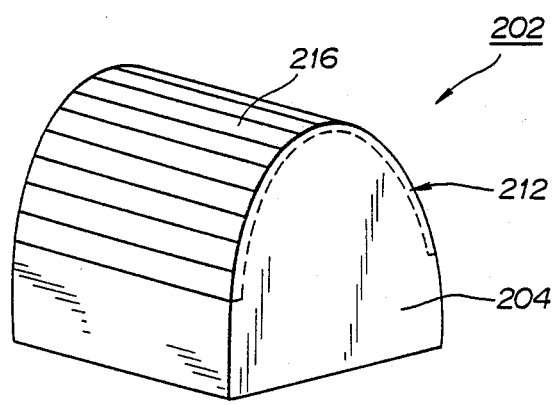
FIG. 7 is a perspective view of another embodiment of the inventive electrostatic adsorbing apparatus.

For instance, although the electrostatic adsorbing plate 12 has been obliquely formed in the first embodiment of the invention, an electrostatic adsorbing plate 212 can be formed like a curve, as shown in FIG. 7, or can be vertically formed. Thus, it should be evident to those skilled in the art that a practically advantageous electrostatic adsorbing apparatus can be constructed to satisfy a specific use requirement.

As another example, although the set of positive and negative electrodes are arranged like a comb in the lateral direction in the first and second embodiments of the invention, the set of positive and negative electrodes can also be arranged like a comb in the vertical direction.

Further, although one enclosing portion has been provided below the vertical adsorbing portions of the electrostatic adsorbing apparatus in the second embodiment of the invention, if more enclosing portions are provided, then various kinds of objects to be adsorbed can be enclosed in one electrostatic adsorbing apparatus, which is practically advantageous.

As described in detail above, according to the invention, a set of electrodes are arranged like a comb on the electrostatic adsorbing plate of the electrostatic adsorbing apparatus and adsorbing portions which extend in the horizontal direction are formed on the surface of the electrostatic adsorbing plate so as to adsorb and laminate objects while slightly vertically offsetting the upper end portions thereof. Therefore, a plurality of objects to be adsorbed consisting of large papers or the like can be easily held. The apparatus is practically advantageous because the storage space of the objects is reduced, and space is effectively used. On the other hand, by sequentially adsorbing and laminating a plurality of objects to a plurality of horizontally extending adsorbing portions while slightly vertically offsetting the upper end portions of the adsorbed objects, each object can be easily extracted and the use efficiency improved. Further, when the objects are stored, it is possible to substantially prevent the appearance of wrinkles or creases on the objects. The use efficiency when using the objects can be preferably maintained. Further, by setting the width of the adsorbing portions to a large value, a stronger electrostatic adsorbing force can be obtained, and effective lamination and adsorption corresponding to the weight of objects to be adsorbed can be realized.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an electrostatic adsorbing apparatus having an electrostatic adsorbing plate for adsorbing and laminating a plurality of objects to be adsorbed, in which said adsorbing apparatus has a set of electrodes, and said electrostatic adsorbing plate adsorbs and holds sheet-shaped objects by an electrostatic adsorbing force induced by said set of electrodes, the improvement comprising said set of electrodes being arranged like a comb in the electrostatic adsorbing plate, and a plurality of horizontally extending adsorbing portions formed on the surface of the electrostatic adsorbing plate so as to adsorb and laminate a plurality of said sheet-shaped objects such that upper end portions of the objects are slightly vertically offset from each other.

2. The apparatus of claim 1, wherein said surface of said electrostatic adsorbing plate has a generally inclining configuration, said adsorbing portions being arranged on said adsorbing plate in a generally successively inclining relationship to one another.

3. In an electrostatic adsorbing apparatus having an electrostatic adsorbing plate for adsorbing and laminating a plurality of objects to be adsorbed, in which said adsorbing apparatus has a set of electrodes, and said electrostatic adsorbing plate adsorbs and holds sheet-shaped objects by an electrostatic adsorbing force induced by said set of electrodes, the improvement comprising said set of electrodes being arranged like a comb in the electrostatic adsorbing plate, a plurality of horizontally extending adsorbing portions formed on the surface of the electrostatic adsorbing plate in a generally vertical arrangement so as to adsorb and laminate a plurality of said sheet-shaped objects such that upper end portions of the objects are slightly vertically offset from each other, and an enclosing portion to temporarily enclose said sheet-shaped objects provided below said adsorbing portions.

4. The apparatus of claim 3, including a frame for supporting said adsorbing plate, said enclosing portion being pivotally supported on said frame for pivotal movement between a storage position generally parallel to said adsorbing plate and an inclined position generally inclined relative to said adsorbing plate.

5. The apparatus of claim 4, including means for releasably locking said enclosing portion against pivotal movement when said enclosing portion is at a desired inclined position relative to said adsorbing plate.

6. A portable electrostatic sheet-holding apparatus, comprising a leg structure adapted to be movingly supported on a floor, a frame structure fixed to and projecting upwardly from said leg structure and including a pair of sidewardly-spaced upright side frame elements, a main plate-like body extending between and being fixed to said side frame elements and being generally vertically oriented and defining thereon a generally vertically extending side surface, an electrostatic adsorbing plate overlying said side surface, said adsorbing plate having an interfitting set of comb-like electrodes for generating electrostatic holding force, and a plurality of horizontally extending adsorbing portions formed on the surface of said electrostatic adsorbing plate, said horizontally extending adsorbing portions being disposed in vertically adjacent relationship to one another so that a plurality of sheets can be attached to the electrostatic adsorbing plate in such manner that upper end portions of the sheets are individually electrostatically held against the respective adsorbing portions in vertically offset relationship to one another.

7. The apparatus of claim 6, including a sheet storage device mounted on said frame structure vertically below said adsorbing portions for temporarily storing sheets therein.

8. The apparatus of claim 7, wherein the storage device comprises an upwardly-opening box-like arrangement having closely-spaced front and rear walls defining a narrow sheet-storing space therebetween, said device extending horizontally between said side frame elements, and means supporting said storage device on said side frame elements for pivotal movement between a generally vertical orientation and a generally inclined orientation.

9. The apparatus of claim 6, wherein the adsorbing plate and the side surface of the main body are sloped at an angle of about 5° to about 15° relative to the vertical as they extend downwardly.

* * * * *